(12) United States Patent
Yuki et al.

(10) Patent No.: US 12,441,971 B2
(45) Date of Patent: Oct. 14, 2025

(54) SHEET-SHAPED CELL CULTURE PREPARATION DEVICE

(71) Applicant: TERUMO KABUSHIKI KAISHA, Tokyo (JP)

(72) Inventors: Risa Yuki, Kanagawa (JP); Yuka Shimazu, Kanagawa (JP); Tetsuya Yamaguchi, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 811 days.

(21) Appl. No.: 17/685,568

(22) Filed: Mar. 3, 2022

(65) Prior Publication Data

US 2022/0267706 A1 Aug. 25, 2022

Related U.S. Application Data

(63) Continuation of application No. PCT/JP2020/037095, filed on Sep. 30, 2020.

(30) Foreign Application Priority Data

Sep. 30, 2019 (JP) .................................. 2019-178998

(51) Int. Cl.
*C12M 1/00* (2006.01)
*C12N 5/00* (2006.01)

(52) U.S. Cl.
CPC ............ *C12M 23/40* (2013.01); *C12M 23/14* (2013.01); *C12M 23/58* (2013.01); *C12M 29/04* (2013.01); *C12N 5/0062* (2013.01)

(58) Field of Classification Search
CPC .................................................... C12M 23/14
See application file for complete search history.

(56) References Cited

U.S. PATENT DOCUMENTS

2020/0308530 A1 10/2020 Senda et al.

FOREIGN PATENT DOCUMENTS

| JP | H06-327461 | 11/1994 |
|---|---|---|
| JP | 5592080 A | 11/2010 |
| JP | 2015-109877 A | 6/2015 |
| JP | 2016-21915 A | 2/2016 |

(Continued)

OTHER PUBLICATIONS

International Search Report for International Application No. PCT/JP2020/037095, mailed Dec. 1, 2020.

(Continued)

*Primary Examiner* — Rosanne Kosson
(74) *Attorney, Agent, or Firm* — Sheridan Ross P.C.

(57) ABSTRACT

A device including a mixing bag for mixing liquids, a cell-suspension bag fluidly connected to the mixing bag, a diluent bag fluidly connected to the mixing bag, and a fluidly connected to the mixing bag is capable of easily preparing a sheet-shaped cell culture without requiring any large-scale equipment. The sheet-shaped cell culture can be aseptically prepared by the device, while reducing the risk of contamination, by using the mixing bag which is fluidically connected to the other bags. The device includes a support having a foldable structure. At least one of the cell-suspension bag, the diluent bag and the filter is fixed to various portions of the support. The device can be folded into a compact size, by folding the various portions of the support, allowing for efficient transportation and storage.

20 Claims, 2 Drawing Sheets

(56) References Cited

FOREIGN PATENT DOCUMENTS

WO     WO 2016/152592 A1     9/2016

OTHER PUBLICATIONS

Written Opinion for International Application No. PCT/JP2020/037095, mailed Dec. 1, 2020.
International Preliminary Report on Patentability for International Application No. PCT/JP2020/037095, mailed Apr. 14, 2022.
Notice of Reasons for Refusal (Including Translation) for corresponding Japanese Patent Application No. 2021-551357, mailed Apr. 12, 2024.
English Translation of Official Action for Japan Patent Application No. 2021-551357, dated Sep. 20, 2024, 5 pages.

SHEET-SHAPED CELL CULTURE PREPARATION DEVICE

CROSS REFERENCE TO RELATED APPLICATIONS

The present application is a continuation of and claims benefit to PCT Application No. PCT/JP2020/037095 filed on Sep. 30, 2020, entitled "SHEET-SHAPED CELL CULTURE PREPARATION DEVICE" which claims priority to Japanese Patent Application No. 2019-178998 filed on Sep. 30, 2019. The entire disclosures of the applications listed above are hereby incorporated herein by reference, in their entirety, for all that they teach and for all purposes.

BACKGROUND

The present disclosure relates to a device for use in the preparation sheet-shaped cell cultures.

In recent years, attempts to transplant various cells have been performed for the repair of damaged tissues and the like. For example, for the repair of muscle tissues damaged due to an ischemic heart disease such as angina pectoris or myocardial infarction, attempts to utilize fetal cardiomyocytes, skeletal myoblasts, mesenchymal stem cells, cardiac stem cells, embryonic stem (ES) cells, induced pluripotent stem (iPS) cells, and the like have been performed, as disclosed in Haraguchi et al., Stem Cells Transl Med. 2012 February; 1(2): 136-41 ("Haraguchi").

As an example of such attempts, a sheet-shaped cell culture, which is obtained by forming cells into a sheet shape, has been developed. Part of the use of such a cell culture has entered the stage of clinical application, and it has already been used for regenerative medicine in the medical practice, as disclosed by HeartSheet (registered trademark) brand cellular and tissue-based product package insert (revised in February 2019) ("HeartSheet") developed by Terumo Corporation.

When cell cultures in clinical application are prepared, it becomes necessary to work in a high-clean space, for example, an aseptic area (See, e.g., HeartSheet). For example, Japanese Patent No. JP-5592080-B1 discloses a cell culture system in which the contamination risk in an aseptic area is reduced. In the system, large-scale equipment such as an isolator is introduced in order to reduce the risk of contamination.

SUMMARY

In such a situation, where the cell cultures are used in a clinical application, it is essential to introduce large equipment that provides a space keeping the high cleanliness in order to reduce the risk of contamination, and for the introduction, a large amount of capital investment costs are required, and thus the present inventors have faced a problem that the introduction of such equipment and the handling of cell cultures for transplantation are limited to some highly specialized facilities. Therefore, an object of the present disclosure is to provide a device that can solve such problems, as discussed above, and can easily prepare a sheet-shaped cell culture without requiring any large-scale equipment.

As a result of the intensive study to solve the above problem, the present inventors have found that a sheet-shaped cell culture can be aseptically prepared while reducing contamination risks by using a device that includes independent, or separate, bags and a filter that are each fluidly connected to a mixing bag for mixing liquids.

That is, the present disclosure relates to the following:

[1] A device for use in preparation of a sheet-shaped cell culture, including: a mixing bag for mixing liquids; a cell-suspension bag being fluidly connected to the mixing bag; a diluent bag being fluidly connected to the mixing bag; and a filter being fluidly connected to the mixing bag.

[2] The device described in [1], further including an effluent bag being fluidly connected to the filter.

[3] The device described in [1] or [2], in which fluid connection between the mixing bag and the filter is formed of a circular loop-shaped flow path.

[4] The device described in any one of [1] to [3], further including a medium bag being fluidly connected to the mixing bag.

[5] The device described in any one of [1] to [4], further including a culture bag capable of being fluidly connected to the mixing bag.

[6] The device described in [5], further including one or more of an effluent-during-culture bag capable of being fluidly connected to the culture bag, a pretreatment-solution bag capable of being fluidly connected to the culture bag, and a washing-solution bag capable of being fluidly connected to the culture bag.

[7] The device described in any one of [1] to [6], further including a support having a foldable structure, in which each bag and/or the filter are fixed to the support.

[8] A method for treating a disease that is ameliorated by application of a sheet-shaped cell culture, including applying an effective amount of a sheet-shaped cell culture prepared by using the device described in any one of [1] to [7] to a subject in need thereof.

According to the present disclosure, a cell suspension and a diluent each can be aseptically transferred in a mixing bag. According to this, the cell suspension can be aseptically easily mixed with the diluent in the mixing bag while reducing the risk of contamination. Further, harmful substances can be appropriately removed with a simple operation, and the work can be made uniform, as a result of which the survival rate of cells is improved. Furthermore, according to the present disclosure, when the cell suspension is thawed, the cell suspension can be rapidly aseptically mixed with a diluent, and thus the adverse effects of cytotoxic components on cells can be suppressed to the minimum.

According to the present disclosure, the cells can be washed without using any centrifugal separator. Moreover, according to the present disclosure, the process of washing cells can be aseptically repeated, and therefore, more appropriately-washed cells can be obtained.

According to the present disclosure, a series of processes from the thawing of frozen cells to the sheeting formation can be aseptically performed in a device without requiring any large-scale equipment. In addition, in the present disclosure, since the washed cells can be aseptically inoculated in a culture container, the risk of contamination is reduced. Further, according to the present disclosure, a culture bag before the sheeting formation process can be aseptically pretreated. In addition, according to the present disclosure, the washing of a sheet-shaped cell culture after completion of the sheeting formation process can also be aseptically performed. Moreover, according to the present disclosure, the device can be folded compactly, and thus can be efficiently transported and stored.

DETAILED DESCRIPTION

Hereinafter, embodiments of the present disclosure will be described in detail with reference to the accompanying drawings.

In one aspect, the present disclosure relates to a device for use in preparation of a sheet-shaped cell culture, including: a mixing bag for mixing liquids; a cell-suspension bag being fluidly connected to the mixing bag; and a diluent bag being fluidly connected to the mixing bag.

In the present disclosure, the expression "sheet-shaped cell culture" may be used herein to refer to a cell culture in a sheet shape formed by connecting cells in the cell culture to each other. The cells may be connected to each other directly (including connection through a cellular element such as an adhesion molecule) and/or through a mediator. The mediator is not particularly limited, as long as the mediator is a substance that can at least physically (e.g., mechanically) connect cells to each other; examples of the mediator may be, but are in no way limited to, an extracellular matrix or the like. The mediator is preferably derived from a cell, and more specifically derived from a cell that forms a cell culture. The cells are at least physically (e.g., mechanically) connected to each other, but may additionally or alternatively be chemically (e.g., covalently, ionically, etc.) and/or electrically connected to each other. The sheet-shaped cell culture may be formed of one cell layer (e.g., a single layer), or may alternatively be formed from two or more cell layers (e.g., two cell layers, three cell layers, four cell layers, five cell layers, six cell layers, etc.) to form a laminated multilayer body. Further, the sheet-shaped cell culture may form a three-dimensional structure having a thickness exceeding the thickness of one cell without exhibiting any clear layered structure of the cells. For example, in the vertical section of the sheet-shaped cell culture, the cells may be present in a state of being non-uniformly (for example, mosaic-like) arranged without being uniformly aligned in the horizontal direction.

The sheet-shaped cell culture may not contain a scaffold (e.g., a support, etc.). The scaffold may be used in some cases in order to attach cells onto the surface and/or to the inside of the scaffold, and to maintain the physical integrity of the sheet-shaped cell culture. One example of a scaffold may include a membrane made of polyvinylidene difluoride (PVDF) or the like. In some examples, the sheet-shaped cell culture of the present disclosure can maintain the physical integrity even without such a scaffold. Further, the sheet-shaped cell culture of the present disclosure may comprise only cell-derived substances forming the sheet-shaped cell culture, without containing any other substances.

The cells that can be used with the present disclosure are not particularly limited as long as the cells can form a sheet-shaped cell culture (e.g., adherent cells or adhesive cells). Examples of the adherent cells may include one or more of adhesive somatic cells (e.g., myocardial cells, fibroblasts, epithelial cells, endothelial cells, liver cells, pancreatic cells, kidney cells, adrenal cells, periodontal ligament cells, gingival cells, periosteal cells, skin cells, synovial cells, chondrocytes, etc.), and stem cells (e.g., tissue stem cells such as myoblasts, heart stem cells, pluripotent stem cells such as embryonic stem cells, induced pluripotent stem (iPS) cells, mesenchymal stem cells, etc.). The somatic cells may be stem cells, particularly cells different from iPS cells (e.g., iPS cell-derived adherent cells). Non-limiting examples of the cells forming a sheet-shaped cell culture may include one or more of myoblasts (e.g., skeleton myoblasts), mesenchymal stem cells (e.g., bone marrow, adipose tissue, peripheral blood, skin, hair root, muscle tissue, endometrium, placenta, umbilical cord blood-derived cells, etc.), myocardial cells, fibroblasts, heart stem cells, embryonic stem cells, iPS cells, synovial cells, chondrocytes, epithelial cells (e.g., oral mucosal epithelial cells, retinal pigment epithelial cells, nasal epithelial cells, etc.), endothelial cells (e.g., vascular endothelial cells), liver cells (e.g., liver parenchymal cells), pancreatic cells (e.g., pancreatic islet cells), kidney cells, adrenal cells, periodontal ligament cells, gingival cells, periosteal cells, and skin cells. Non-limiting examples of the iPS cell-derived adherent cells may include one or more of iPS cell-derived myocardial cells, fibroblasts, epithelial cells, endothelial cells, liver cells, pancreatic cells, kidney cells, adrenal cells, periodontal ligament cells, gingival cells, periosteal cells, skin cells, synovial cells, and chondrocytes.

The cells that form a sheet-shaped cell culture can be derived from any organism that can be treated with the sheet-shaped shaped cell culture. Such an organism is not limited, and examples of the organism include human, a non-human primate, dog, cat, pig, horse, goat, sheep, rodent animals (e.g., mouse, rat, hamster, guinea pig, etc.), and rabbit. Further, the number of types of the cells that form a sheet-shaped cell culture is not particularly limited, and while in some embodiments only one type may be used to form the sheet-shaped cell culture, in other embodiments two or more types of cells may be used. In a case where there are two or more types of the cells that form a sheet-shaped cell culture, the content ratio (e.g., purity) of the most abundant cells may be 50%, 60%, 70%, or 75% or more once the sheet-shaped cell culture is formed.

The cells may be cells derived from heterogeneous cells, or may also be cells derived from homogeneous cells. In this regard, in a case where the sheet-shaped cell culture is used for transplantation, the expression "cells derived from heterogeneous cells" means cells derived from an organism of a species different from that of the recipient. For example, in a case where the recipient is human, cells derived from monkey or pig correspond to the cells derived from heterogeneous cells. Further, the expression "cells derived from homogeneous cells" means cells derived from an organism of the same species as that of the recipient. For example, in a case where the recipient is human, human cells correspond to the cells derived from homogeneous cells. The cells derived from homogeneous cells include self-derived cells (also referred to as "self cells" or "autologous cells"), that is, recipient-derived cells, as well as cells derived from homogeneous non-self cells (also referred to as "Allogeneic cells"). The self-derived cells may be preferable in the present disclosure because the self-derived cells do not cause any rejection even when being transplanted. However, cells derived from heterogeneous cells, or cells derived from homogeneous non-self cells can also be used. In a case where such cells derived from heterogeneous cells or derived from homogeneous non-self cells are used, the cells may require immunosuppressive treatment in order to suppress the rejection, in some cases. Note that in the present disclosure, the cells other than the self-derived cells, that is, cells derived from heterogeneous cells, and cells derived from homogeneous non-self cells may also be collectively referred to as "non-self-derived cells". In one embodiment of the present disclosure, the cells are autologous cells or allogeneic cells. In one embodiment of the present disclosure, the cells are autologous cells. In another embodiment of the present disclosure, the cells are allogeneic cells.

The sheet-shaped cell culture can be produced by any known method (see, e.g., Japanese Patent Application Nos. JP-2010-081829-A and JP-2011-110368-A). The method for producing a sheet-shaped cell culture typically may include a step of pretreating a culture substrate in a medium, a step of inoculating cells on the culture substrate, a step of sheeting the inoculated cells, and a step of peeling off the formed sheet-shaped cell culture from the culture substrate, but is not limited thereto. Before the step of inoculating cells on the culture substrate, a step of freezing the cells and a step of thawing the cells may be performed. Further, a step of washing the cells may be performed after the step of thawing the cells. Each of these steps can be performed by any known technique suitable for producing a sheet-shaped cell culture.

In the present disclosure, the "preparation of a sheet-shaped cell culture" includes all processes from thawing a cell suspension to forming a sheet-shaped cell culture and may include, but is no way limited to, processes of washing cells, mixing with a medium, culturing the cells, inoculating the cells, forming a sheet, and washing the sheet.

In the present disclosure, the "washing the cells" may include the following processes of: i) diluting a cell suspension by being mixed with a diluent; ii) removing a liquid except for the cells from the diluted cell suspension; iii) further adding a diluent to the cells; and iv) repeating the processes of ii) and iii). In the present disclosure, the "mixing with a medium" may include mixing the washed cells with a medium. In the present disclosure, the "culturing the cells" may include applying the cells mixed with a medium to an incubator for proliferation of the cells. In the present disclosure, the "inoculating the cells" may include transferring aseptically the mixture of the cells mixed with a medium in a bag to another bag. In the present disclosure, the "forming a sheet" may include connecting the cells physically and functionally to each other, and forming the cells in a sheet shape. In the present disclosure, the "washing the sheet" may include removing excess components adhered to a sheet-shaped cell culture.

In the present disclosure, the term "bag" may be used herein to refer to a container in a bag shape having a space for use in preparation of a sheet-shaped cell culture. In some embodiments, the bag may be made of a flexible material that is deformed by pressing. In some embodiments, a cell-suspension bag, a diluent bag, an effluent bag, a medium bag, a pretreatment-solution bag, a washing-solution bag, and an effluent-during-culture bag refer respectively to individual, or separate, bags for storing one of a cell suspension, a diluent, an effluent, a medium, a pretreatment solution, a washing solution, and an effluent during culture. In some embodiments, the cell suspension may be frozen and stored as cryopreserved cells. The mixing bag refers to a bag that allows mixing work in a space inside the bag. The culture bag has a space in which a sheet-shaped cell culture can be formed, and preferably has a flat bottom. More preferably, the culture bag contains a temperature-responsive substrate.

In the present disclosure, the expression "cryopreserved cells" usually means cryopreserved cells themselves, but may also mean one cryopreserved unit of the cryopreserved cells. In some embodiments, the cryopreserved unit means a cell group that are cryopreserved together as a group, for example, one tube. Accordingly, in such embodiments, when the "cryopreserved cells" are thawed, the "cell suspension" that has been frozen can be obtained.

In the present disclosure, the liquids include a cell suspension, a diluent, an effluent, a medium, a washing solution, a pretreatment solution, and an effluent during culture. These liquids may be collectively referred to as liquid.

The diluent that can be used in the present disclosure is not particularly limited, but a diluent that does not cause any physicochemical damage to the cells is preferable. Examples of the diluent are not limited to, but may include, a liquid medium such as Dulbecco's Modified Eagle Medium (DMEM), a Hanks balanced salt solution, a buffer solution such as phosphate-buffered saline (PBS), an isotonic solution such as saline solution, and distilled water. In addition, into such solutions above, other components such as albumin may further be added.

The medium that can be used in the present disclosure may be any known medium used for culturing cells. Examples of the medium are not limited to, but may include DMEM, Minimum Essential Media (MEM), F12 medium, DME, RPMI1640, MCDB (such as MCDB102, 104, 107, 120, 131, 153, or 199), L15, SkBM, RITC80-7, and DMEM/F-12.

The pretreatment solution that can be used in the present disclosure is not particularly limited, but is desirably a solution that assists in the formation of a sheet-shaped cell culture. Examples of the pretreatment solution may include, but are not limited to, DMEM, MEM, F12, DME, RPMI1640, MCDB (such as MCDB102, 104, 107, 120, 131, 153, or 199), L15, SkBM, RITC80-7, DMEM/F-12, serum, and steroid.

The washing solution that can be used in the present disclosure is not particularly limited, but is desirably any solution that does not adversely affect the sheet-shaped cell culture. Examples of the washing solution may include, but are not limited to, a Hanks balanced salt solution, and liquid media such as HEPES, DMEM, RPMI, and Ham's F-12.

The filter that can be used in the present disclosure may refer to a filter that can separate cells from other liquid and remove unnecessary liquid. Examples of the filter may include, but are not limited to, a cross-flow filtration filter. In embodiments where a circulation loop is formed between the mixing bag and the filter, only the cells separated by the filter can be returned to the mixing bag. In a case where an effluent bag is connected to the filter, the filtered unnecessary liquid can be transferred to the effluent bag.

The device according to the present disclosure may, in at least one embodiment, include a support. The support may provide a physical structure for fixing, holding, or otherwise supporting each bag and/or filter. In some examples, the support may have any shape as long as it has a foldable structure. In one embodiment, the support may be made of a material that can be frozen (e.g., a material capable of withstanding temperatures below zero degrees Celsius (0° C.)). In one embodiment, the support may include a hole on which something capable of being hung with a hook or the like can be hooked.

The treatment method according to the present disclosure may include a step of applying a sheet-shaped cell culture prepared by using the device according to the present disclosure to a subject in need thereof. The treatment method according to the present disclosure may further include a step of collecting cells for producing a sheet-shaped cell culture or tissues to be a supply source of the cells from a subject before the step of producing the sheet-shaped cell culture. In one embodiment, a subject from which cells or tissues to be a supply source of the cells are collected is the same individual as a subject to which the sheet-shaped cell culture, composition or the like is administered. In another embodiment, a subject from which cells or tissues to be a supply source of the cells are collected is another individual of the same species as that of a subject to which the sheet-shaped cell culture, composition or the like is administered. In another embodiment, a subject from which cells or tissues to be a supply source of the cells are collected is an individual of a species different from that of a subject to which the sheet-shaped cell culture, composition or the like is administered.

In the present disclosure, the term "subject" may be used herein to refer to any individual organism, preferably an animal, furthermore preferably a mammal, and still more preferably an individual human. In some embodiments, the subject may be healthy or may suffer from some disease, but in a case where treatment of a disease that is ameliorated by the application of a sheet-shaped cell culture (for example, disease associated with tissue abnormalities) is planned, the subject means typically a subject who suffers from the disease or has a risk of developing the disease.

Further, the term "treatment" may mean to cure of disease, and/or all types of medically acceptable prophylactic and/or therapeutic interventions for the purpose of temporary remission, prophylaxis, and/or the like. For example, the term "treatment" may include any medically acceptable intervention for the various purposes, including retardation or suspension of the progression of a disease that is ameliorated by the application of a sheet-shaped cell culture (e.g., disease associated with tissue abnormalities), regression or disappearance of lesion, prevention of the onset or recurrence of the disease, and the like.

In the present disclosure, the term "effective amount" may be used herein to refer to an amount (e.g., the size, the weight, or the number of sheets of sheet-shaped cell culture) with which the onset or recurrence of disease can be suppressed, the symptoms can be alleviated, or the progression can be retarded or suspended, and preferably an amount with which the onset or recurrence of disease is prevented, or the disease is cured. Further, an amount with which any adverse effect exceeding the benefit of administration is not exerted is preferable. Such an amount can be appropriately determined by, for example, a test or the like in an experimental animal such as mouse, rat, dog, or pig, or a disease model animal, and such a test method is well known to a person skilled in the art. In addition, the size of the histological lesion to be treated can be an important indicator for determining the effective amount.

As the application method, typically, direct application to tissues can be mentioned. The frequency of application is typically once per treatment, but in a case where the desired effect cannot be obtained, multiple sheets can be applied. In the direct application to tissues, for example, a method of applying the sheet-shaped cell culture and the like of the present disclosure so as to be pasted to a disease site of the tissues, or the like is used.

The tissues to be subjected to the treatment (e.g., applicable tissues) are not limited, and examples of the tissues may include heart (e.g., myocardia), corneal, retina, esophagi, skin, joint, cartilage, liver, pancreas, gingiva, kidney, thyroid gland, skeletal muscles, and middle ear. Further, the disease to be subjected to the treatment is not limited, and examples of the disease may include a heart disease (e.g., myocardial injury such as myocardial infarction, or cardiac injury, cardiomyopathy such as ischemic cardiomyopathy, dilated cardiomyopathy, or dilated phase hypertrophic cardiomyopathy); a corneal disease (e.g., corneal epithelial stem cell exhaustion, corneal injury such as thermal/chemical corrosion, corneal ulcer, corneal opacity, corneal perforation, corneal scar, Stevens-Johnson syndrome, or ocular pemphigoid); a retinal disease (e.g., retinitis pigmentosa, age-related macular degeneration); an esophageal disease (e.g., prevention or the like of inflammation/stenosis of the esophagus after esophageal surgery, such as removal of esophageal cancer); a skin disease (e.g., skin injury such as a burn); a joint disease (e.g., osteoarthritis); a cartilage disease (e.g., damage of cartilage); a liver disease (e.g., chronic liver disease); a pancreatic disease (e.g., diabetes); a dentistry disease (e.g., periodontal disease); a kidney disease (e.g., renal failure, renal anemia, renal osteodystrophy); a thyroid disease (e.g., hypothyroidism); a muscular disease (e.g., muscle damage, or myositis); and a middle ear disease (e.g., otitis media).

In a case where the application place moves frequently due to beating or peristaltic movement, for example, in a case where the applicable tissues are an organ such as the heart, the sheet-shaped cell culture and the like of the present disclosure may fall off from the application place only by being pasted to the application place. Accordingly, in one preferable embodiment of the treatment method according to the present disclosure, it is included that the sheet-shaped cell culture and the like of the present disclosure is applied to a disease site, and then the sheet-shaped cell culture and the like of the present disclosure is sutured and fixed by passing a suture needle or the like through the penetration site. In this way, the sheet-shaped cell culture and the like of the present disclosure applied to the disease site can be prevented from falling off from the application place.

Hereinafter, the present disclosure will be described in detail based on suitable embodiments while making reference to drawings. Note that the size of each member in drawings is appropriately emphasized for the sake of explanation, and does not represent the actual ratio or the size.

Figure 1:
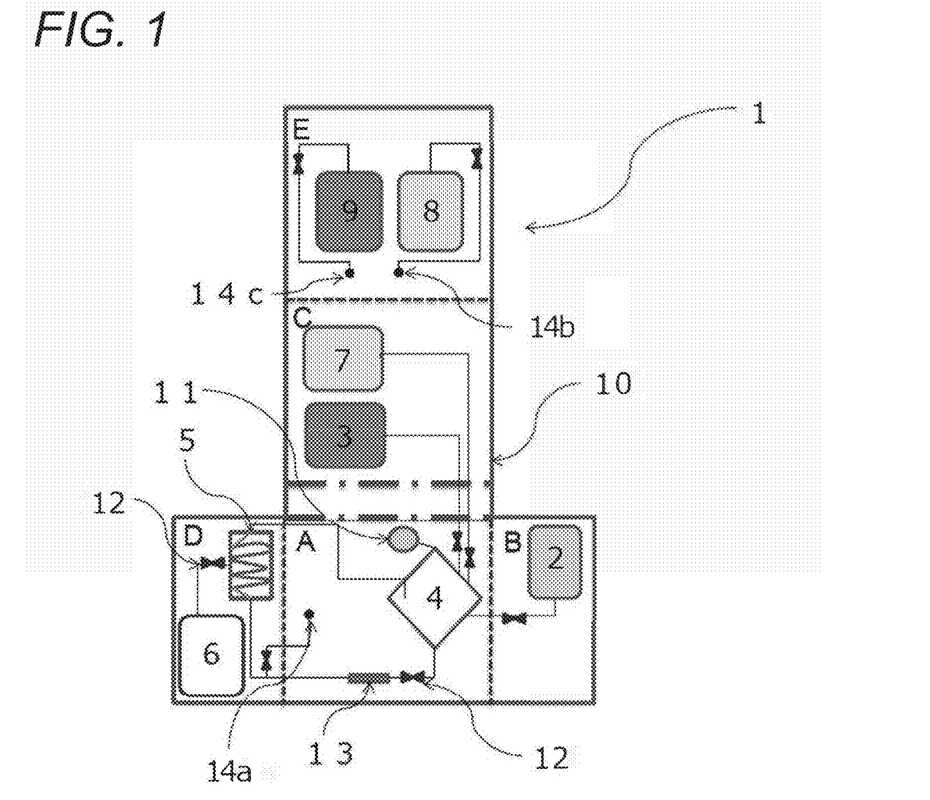
FIG. 1 is a schematic diagram depicting a device according to at least one embodiment of the present disclosure.
Figure 2:
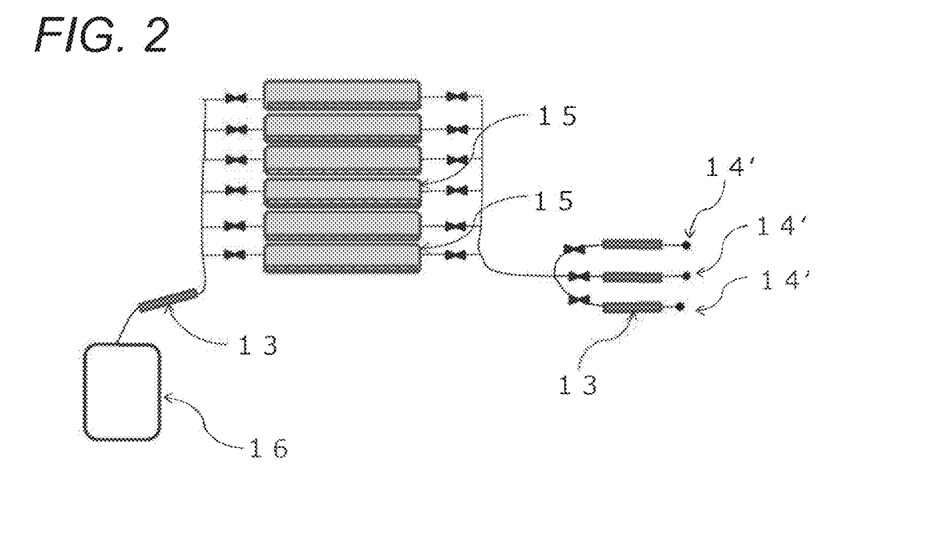
FIG. 2 is a schematic diagram depicting culture bags of the device according to at least one embodiment of the present disclosure.
Figure 3:
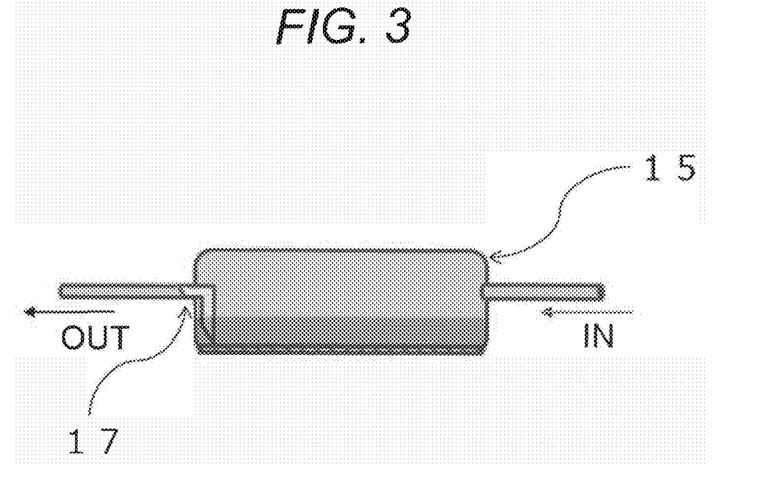
FIG. 3 is a schematic diagram depicting a detailed view of one of the culture bags shown in FIG. 2.

First, a device 1 according to at least one embodiment of the present disclosure will be described. FIG. 1 is a schematic diagram of a device 1 according to an embodiment of the present disclosure. FIG. 2 is a schematic diagram of culture bags 15 of the device 1 according to the embodiment of the present disclosure described in conjunction with FIG. 1. FIG. 3 is a schematic diagram of one of the culture bags 15 shown in FIG. 2.

As shown in FIG. 1, the device 1 includes a cell-suspension bag 2, a diluent bag 3, and a mixing bag 4. The cell-suspension bag 2 and the diluent bag 3 are each fluidly connected to the mixing bag 4. As used herein, the expression that one unit is "fluidly connected" to another unit, or that one unit is in "fluid communication" with another unit, means that these two units are connected to each other by a tube-like pipe (e.g., conduit, tube, tubing section, etc.), and through the tube-like pipe, a fluid flows without contact with the outside air.

During the use of the device 1, a cell suspension stored in the cell-suspension bag 2 can be aseptically transferred to the mixing bag 4 through the fluid connection. In a case where the cell suspension is frozen, the cell suspension can be thawed in the cell-suspension bag 2 before the transfer. For the thawing, for example, a warm bath may be used. Further, since the cell-suspension bag 2 and the mixing bag 4 are present separately, the cell-suspension bag 2 can be made smaller to improve the efficiency of freezing and thawing, and the mixing bag 4 in which the cell suspension is mixed with the diluent can be made larger. In some embodiments, physical force, such as squeezing a bag, and/or gravity, such as positioning one bag higher up than another bag, may be used to transfer of liquid through a flow path from one bag to another (e.g., from the cell-suspension bag 2 to the mixing bag 4). Furthermore, in a case where the fluid connection is formed of a tube, with the attachment of a peristaltic pump to part of the tube, the tube may be squeezed from the outside to perform the transfer. In addition, with the arrangement of an air filter 11 to each bag, the outside air may be aseptically taken into the bag to assist the transfer.

Further, a diluent stored in the diluent bag 3 can also be aseptically transferred to the mixing bag 4 through the fluid connection. Furthermore, since the diluent bag 3 and the mixing bag 4 are present separately, with the adjustment of the flow rate of the diluent, the number of cells that die due to the rapid change in osmotic pressure can be reduced. Moreover, with the control of the flow of the diluent, the cell suspension can be diluted stepwise. The flow rate can be adjusted, for example, by the control of the pressing part and pressing force when pressing the bag, or by the appropriate control of the height difference between bags. In addition, there may be a control part 12 in part of the fluid connection to control the opening and closing of the part of the fluid connection, and in a case where the fluid connection is formed of, for example, a tube, the flow rate and the flow can be controlled by using something like a valve or a clamp as the control part 12.

The cell suspension and diluent aseptically transferred to the mixing bag 4 can be aseptically mixed in the mixing bag 4. In general, the cell suspension may contain cytotoxicity components (e.g., dimethyl sulfoxide (DMSO)). Accordingly, in a case where the cell suspension is frozen, the device 1 can rapidly mix the cell suspension with the diluent in the mixing bag 4 as soon as the cell suspension is thawed, while reducing the risk of contamination, and the influence of the cytotoxicity components in the cell suspension can be suppressed, minimized, or otherwise reduced.

As shown in FIG. 1, the device 1 may further include a filter 5 that is fluidly connected to the mixing bag 4. The filter 5 can filter a mixture of a cell suspension with a diluent, which is aseptically transferred from the mixing bag 4. With the filtration of such a mixture, unnecessary liquid can be removed from the mixture together with cytotoxicity components without using any centrifugal separator, resulting in a more concentrated mixture. The filter 5 may be included in the mixing bag 4. In some embodiments, the device 1 can filter a liquid when the liquid is transferred to the mixing bag 4 and/or when the liquid is transferred from the mixing bag 4.

As shown in FIG. 1, the device 1 may further include an effluent bag 6. In this regard, the effluent bag 6 may also be fluidly connected to the filter 5. The unnecessary liquid filtered by the filter 5 is aseptically transferred to the effluent bag 6 through the fluid connection, and can be stored in the effluent bag 6. Therefore, the device 1 can be used without contaminating the surrounding environment. The effluent bag 6 may be fluidly connected to the mixing bag 4. In this case, by compactly folding the device 1 and applying the device 1 to a centrifugal separator, the cells can be separated from a supernatant in the mixing bag 4, and only the supernatant can be transferred to the effluent bag 6.

As shown in FIG. 1, the fluid connection between the mixing bag 4 and the filter 5 is formed of a circular loop-shaped flow path. In a case where the fluid connection is formed in this way, the cells filtered in the filter 5 can be aseptically returned to the mixing bag 4 again. Next, by further transferring the diluent in the diluent bag 3 to the mixing bag 4 and mixing the diluent with the returned cells, the cell suspension can be diluted stepwise. Further, the mixed liquid is transferred to the filter 5 again, and filtered. Since the fluid connection between the mixing bag 4 and the filter 5 is formed of a circular loop-shaped flow path, the cells passed through the filter 5 are returned to the mixing bag 4 again, and thus this series of operations can be repeated many times. Furthermore, in a case where the flow path is formed of a tube, in order to circulate the cells in the circular loop-shaped flow path, a peristaltic pump is attached to a pump connection part 13 of the tube, and the cells may be transferred by the pump. By using the device 1 in this way, the cells can be aseptically and more appropriately washed without using any centrifugal separator, that is, the cytotoxicity components contained in the cell suspension can be more appropriately removed. Furthermore, the diluent may be transferred from a single diluent bag 3 at different or various times, or may be transferred from a plurality of diluent bags 3 once each (e.g., the diluent bag 3 may be a single bag that transfers a diluent at three different times, or alternatively the diluent bag 3 may comprise three diluent bags that each transfer diluent once, etc.). With such a configuration, the whole amount can be transferred in all of the diluent bags 3, and thus it is not necessary to adjust the amount of liquid.

As shown in FIG. 1, the device 1 may further include a medium bag 7 that is fluidly connected to the mixing bag 4. In this case, a medium stored in the medium bag 7 can be aseptically transferred to the mixing bag 4. Accordingly, in the mixing bag 4, the cells may be aseptically mixed with the medium, and a mixture of the cells with the medium can be obtained. Further, the cells may be proliferated in the mixing bag 4 by the application of the whole device 1 to a $CO_2$ incubator.

The device 1 may further include one culture bag 15 that can be fluidly connected to the mixing bag 4. As shown in FIG. 2, the device 1 may also include multiple culture bags 15. In some embodiments, the device 1 can be fluidly connected to the culture bags 15 at a connection point 14a shown in FIG. 1 and any one of connection points 14' shown in FIG. 2. In this case, the cells mixed with a medium in the mixing bag 4 can be aseptically transferred to the culture bags 15. In some embodiments, the fluid connection between the mixing bag 4 and the culture bag 15 can be aseptically made, for example, by using a tube joining device (e.g., sterile tubing welder, etc.) or the like in a case where the fluid connection is formed of a tube. The connection between the mixing bag 4 and the culture bag 15 can be aseptically disconnected, for example, by using heat sealing or the like after the cells mixed with a medium is transferred to the culture bag 15. Accordingly, when applying to a $CO_2$ incubator in order to perform sheeting formation, the whole device 1 is not required to be applied to a $CO_2$ incubator, and only the culture bag 15 can be applied to the $CO_2$ incubator. In some embodiments, there may be multiple culture bags 15 as shown in FIG. 2 depending on the number of sheet-shaped cell cultures to be prepared, or the cells mixed with a medium may be transferred from one mixing bag 4 to multiple culture bags 15. Additionally or alternatively, by using a peristaltic pump and a control part such as a valve, the amount of the cells mixed with a medium to be transferred to each culture bag 15 may be adjusted. According to this, an amount of medium suitable for the sheet formation process of a sheet-shaped cell culture can be provided to all of the culture bags 15.

The culture bag 15 may have, for example, a structure as shown in FIG. 3. A liquid flows in from an inflow port on the IN (indicated by arrow) side and flows out from an outflow port on the OUT (indicated by arrow) side in FIG. 3. The outflow port may be provided with an effluent control part 17 that can prevent a sheet-shaped cell culture from being drawn, and this can be achieved, for example, by forming the effluent control part 17 such that the opening of the outflow port faces the inner surface side of the culture bag 15. The bottom of the culture bag 15 may have a temperature-responsive substrate.

As shown in FIG. 2, the device 1 may further include an effluent-during-culture bag 16 that can be fluidly connected to the culture bag 15. In some embodiments, after completion of the sheeting formation process in preparation of a sheet-shaped cell culture by using the device 1, the used medium in the culture bag 15 can be transferred to the effluent-during-culture bag 16. As a result, unnecessary liquid in the culture bag 15 can be removed, and a sheet-shaped cell culture can be more easily recovered.

As shown in FIG. 1, the device 1 may further include a pretreatment-solution bag 8 that can be fluidly connected to the culture bag 15. In this case, the culture bag 15 and the pretreatment-solution bag 8 are connected in a connection part 14b shown in FIG. 1 and any one of connection parts 14' shown in FIG. 2. Before the start of the sheeting formation process in preparation of a sheet-shaped cell culture by using the device 1, a pretreatment solution stored in the pretreatment-solution bag 8 can be transferred to the culture bag 15, and by applying the culture bag 15 to a $CO_2$ incubator while containing the pretreatment solution in the culture bag 15, the inside of the culture bag 15 can be pretreated. The pretreatment may enable the sheeting process to be started while also making the inside of the culture bag 15 more suitable for the culture of the sheet-shaped cell culture, resulting in an improved sheet-shaped cell culture. Further, in a case where the effluent-during-culture bag 16 is further included, a pretreatment solution used for the pretreatment can be transferred to and stored in the effluent-during-culture bag 16. In this regard, in a case where the medium stored in the medium bag 7 can be used as the pretreatment solution, the medium may be transferred to the culture bag 15 by fluidly connecting the medium bag 7, instead of the pretreatment-solution bag 8, to the culture bag 15.

As shown in FIG. 1, the device 1 may further include a washing-solution bag 9 that can be fluidly connected to the culture bag 15. The washing-solution bag 9 may store a Hanks balanced salt solution therein, and in this case, washing can be performed under the conditions suitable for the sheet-shaped cell culture. The culture bag 15 and the washing-solution bag 9 are connected in a connection part 14c shown in FIG. 1 and any one of connection parts 14' shown in FIG. 2. After completion of the sheeting formation process in preparation of a sheet-shaped cell culture by using the device 1, the washing solution stored in the washing-solution bag 9 is aseptically transferred to the culture bag 15, and a sheet-shaped cell culture in the culture bag 15 can be washed with the washing solution. As a result, excess components adhered to the sheet-shaped cell culture are removed, and the sheet-shaped cell culture is in a more suitable condition for the application to a subject. Further, in embodiments where the effluent-during-culture bag 16 is further included, a washing solution used for washing can be transferred to and stored in the effluent-during-culture bag 16. In some embodiments, such as when the diluent stored in the diluent bag 3 is used as the washing solution, the diluent may be transferred to the culture bag 15 by fluidly connecting the diluent bag 3, instead of the washing-solution bag 9, to the culture bag 15.

As shown in FIG. 1, the device 1 may include a support 10 having a foldable structure. Each bag and/or filter 5 may be fixed or connected to the support 10. The device 1 can be folded in accordance with a folding line of the support 10. In embodiments where each bag and/or a filter 5 is fixed to the support 10, each bag and/or the filter 5 can be housed compactly in conjunction with the folding of the support 10. In embodiments where the device 1 includes the support 10, the device 1 may be stored and transported in a folded state. The user first unfolds the folded device 1 for use. In FIG. 1, the support has a plate-shaped structure with five faces A to E, and, for example, a mixing bag 4 may be fixed to the face A, a cell-suspension bag 2 may be fixed to the face B, a diluent bag 3 and a medium bag 7 may be fixed to the face C, a filter 5 and an effluent bag 6 may be fixed to the face D, and a pretreatment-solution bag 8 and a washing-solution bag 9 may be fixed to the face E. The support 10 can be folded in the mountain fold direction along the folding line (e.g., as illustrated in FIG. 1 by a dashed line) and in the valley fold direction along the folding line (e.g., as illustrated in FIG. 1 by a dashed-dotted line), and finally, can be folded to a size of the same area as that of the face A. As described above, since the device 1 can be folded to a small size, with the use of the device 1, the device 1 can be efficiently transported and stored without holding a space for the transportation and the storage.

Further, the device 1 may be made of a material that can be frozen. In this case, the device 1 is folded in a state in which frozen cells are contained, and can be stored under freezing conditions (e.g., conditions below zero degrees Celsius). Furthermore, a hole, on which something capable of being hung with a hook or the like can be hooked, may be included in part of the support 10. With such a structure, when the device 1 is unfolded and used, the device 1 can be hooked and used.

DESCRIPTION OF REFERENCE CHARACTERS 1 device
2 cell-suspension bag
3 diluent bag
4 mixing bag
5 filter
6 effluent bag
7 medium bag
8 pretreatment-solution bag
9 washing-solution bag
10 support
11 air filter
12 control part
13 pump connection part
14a, 14b, 14c, 14' connection part
15 culture bag
16 effluent-during-culture bag
17 effluent control part

What is claimed is:
1. A device for use in the preparation of a sheet-shaped cell culture, the device comprising:
  (a) a mixing bag for mixing liquids;
  (b) a cell-suspension bag fluidly connected to the mixing bag;
  (c) a diluent bag fluidly connected to the mixing bag;
  (d) a filter fluidly connected to the mixing bag; and
  (e) a support having a foldable structure, wherein at least one of the cell-suspension bag, the diluent bag, and/or the filter is fixed to the support.

2. The device of claim 1, further comprising: an effluent bag fluidly connected to the filter.

3. The device of claim 1, wherein a circular, loop-shaped flow path creates a fluid connection between the mixing bag and the filter.

4. The device of claim 1, further comprising: a medium bag fluidly connected to the mixing bag.

5. The device of claim 1, further comprising: a culture bag capable of being fluidly connected to the mixing bag.

6. The device of claim 5, further comprising: at least one effluent-during-culture bag capable of being fluidly connected to the culture bag; a pretreatment-solution bag capable of being fluidly connected to the culture bag; and a washing-solution bag capable of being fluidly connected to the culture bag.

7. A method of preparing a sheet-shaped cell culture by culturing cells in the device of claim 1, the method comprising:
 a) connecting a cell-suspension bag to a mixing bag;
 b) connecting a diluent bag to the mixing bag;
 c) connecting a filter to the mixing bag, wherein at least one of the cell-suspension bag, the diluent bag, or the filter is affixed to a foldable support structure;
 d) flowing a cell suspension from the cell-suspension bag into the mixing bag; and
 e) flowing a diluent from the diluent bag into the mixing bag.

8. The method of claim 7, further comprising:
 connecting an effluent bag to the filter; and
 flowing an effluent from the effluent bag through the filter.

9. The method of claim 1, wherein a circular, loop-shaped flow path connects the filter to the mixing bag.

10. The method of claim 1, further comprising:
 connecting a medium bag to the mixing bag; and
 flowing a medium from the medium bag into the mixing bag.

11. The method of claim 7, further comprising:
 connecting a culture bag to the mixing bag; and
 flowing a temperature-responsive substrate from the culture bag into the mixing bag.

12. The method of claim 11, further comprising:
 connecting one or more effluent-during-culture bags to the culture bag;
 connecting a pretreatment-solution bag to the culture bag;
 connecting a washing-solution bag to the culture bag;
 flowing an effluent during culture from the one or more effluent-during-culture bags into the culture bag;
 flowing a pretreatment solution from the pretreatment-solution bag into the culture bag; and
 flowing a washing solution from the washing-solution bag into the culture bag.

13. An apparatus, comprising:
 a) a foldable support structure, the foldable support structure including a plurality of faces;
 b) a mixing bag for mixing one or more liquids;
 c) a cell-suspension bag in fluidic communication with the mixing bag;
 d) a diluent bag in fluidic communication with the mixing bag; and
 e) a filter in fluidic communication with the mixing bag.

14. The apparatus of claim 13, wherein the mixing bag is disposed on a first face of the plurality of faces, wherein the cell-suspension bag is disposed on a second face of the plurality of faces, and wherein the filter is disposed on a third face of the plurality of faces.

15. The apparatus of claim 14, wherein the second face is capable of folding relative to the first face, and wherein the third face is capable of folding relative to the first face.

16. The apparatus of claim 15, further comprising:
 an effluent bag disposed on the third face and in fluidic communication with the filter.

17. The apparatus of claim 16, wherein a circular, loop-shaped flow path enables the fluidic communication between the mixing bag and the filter.

18. The apparatus of claim 17, further comprising:
 a medium bag disposed on a fourth face of the plurality of faces and in fluidic communication with the mixing bag.

19. The apparatus of claim 13, wherein the foldable support structure is configured to be folded into a compact size comprising a folded area that is a same area as an unfolded face of the plurality of faces.

20. The apparatus of claim 13, wherein the foldable support structure comprises a plate-shaped structure, and wherein the plurality of faces comprises five faces.

* * * * *